(12) United States Patent
Park et al.

(10) Patent No.: US 6,848,011 B2
(45) Date of Patent: Jan. 25, 2005

(54) METHOD AND APPARATUS FOR DISPLAYING DATA OF A DISPLAY SYSTEM

(75) Inventors: Jong Sun Park, Seoul (KR); Won Yong Hwang, Seoul (KR); Jun Seon Kim, Seoul (KR); Hyung Hoon Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 419 days.

(21) Appl. No.: 10/007,170

(22) Filed: Nov. 30, 2001

(65) Prior Publication Data

US 2002/0087748 A1 Jul. 4, 2002

(30) Foreign Application Priority Data

Dec. 29, 2000 (KR) ........................................ 2000-85630

(51) Int. Cl.⁷ ................................................ G06F 3/00
(52) U.S. Cl. ......................... 710/14; 710/11; 709/221; 709/223; 345/204; 345/690
(58) Field of Search ..................... 710/11, 14; 709/221, 709/223; 345/204, 690

(56) References Cited

U.S. PATENT DOCUMENTS

| | | | |
|---|---|---|---|
| 5,488,385 A | * | 1/1996 | Singhal et al. ............... 345/3.1 |
| 5,757,365 A | * | 5/1998 | Ho ............................. 345/212 |
| 5,822,720 A | | 10/1998 | Bookman et al. |
| 5,854,618 A | * | 12/1998 | Kiwiet et al. ............. 715/500.1 |
| 5,870,683 A | * | 2/1999 | Wells et al. ................. 455/566 |
| 6,356,538 B1 | * | 3/2002 | Li ............................. 370/311 |
| 6,385,734 B2 | * | 5/2002 | Atkinson .................... 713/324 |
| 6,597,351 B2 | * | 7/2003 | Saunamaki et al. ......... 345/204 |
| 6,618,773 B1 | * | 9/2003 | Chang et al. ................. 710/16 |

FOREIGN PATENT DOCUMENTS

WO    WO 00/38340    6/2000    ............ H04B/1/40

* cited by examiner

*Primary Examiner*—Fritz Fleming
*Assistant Examiner*—Niketa Patel
(74) *Attorney, Agent, or Firm*—Lee, Hong, Degerman, Kang & Schmadeka (57) ABSTRACT

In an interface apparatus and a method thereof for a display system displaying an image (an animation, a still image and a text) and a text through an I2C (IIC) interface of a main CPU without operating a video codec in a standby mode of a display system, the apparatus includes a main CPU for outputting data including an image and a text according to an operation mode of a system, a video codec being inputted the data and outputting the data by interfacing with the main CPU according to the operation mode and a LCD driver being inputted the data through the video codec in accordance with the operation mode or being inputted the data from the main CPU through the I2C interface of the main CPU and displaying the inputted image and text on the screen.

25 Claims, 14 Drawing Sheets

| 3 Mode Operation |
|---|
| Active Mode(Data Interface 1):<br>-JPEG,GIF<br>-MPEG4<br>-MP3(128kbps).AAC<br>-Animation(Game)<br>-Text Service<br>Standby Mode(Data Interface 2):<br>-Animation, Still Image & Text, Text only<br>Power Down Mode<br>-LCD Driver IC power off, but SRAM is alive |

| Display Scheme |
|---|
| Active Mode<br>-Normal Operation<br>-Main CPU, Video CODEC and LCD driver IC are all alive<br>-LCD display frame rate of ~30 frames/sec<br>Standby Mode<br>-Power Saving Mode(Video CODEC is powered off)<br>-Animation or Still Image & Text or Text can be displayed<br>-LCD display frame rate of~5 frames/sec<br>Power Down Mode<br>-Nothing is displayed, Ready for displaying |

DISPLAY TYPE(2bits)
00: ANIMATION
01: STILL IMAGE & TEXT
10: TEXT ONLY
11: REGISTER CONTROL IMAGE/TEXT(1bit)
0: TEXT DATA
1: IMAGE DATA DATA TYPE(2bit)
00: BURST DATA
01: AREA DATA
10: LINE DATA
11: PIXEL DATA OSD MEMORY SELECTION(1bit)
0: OSD MEMORY 1(FIRST)
1: OSD MEMORY 2(SECOND)

END OF FRAME DATA(1bit)
0: NOT EOFD
1: EOFD

FIG. 4

IMAGE DATA REPRESENTATION(3bits)
000: BLACK
001: BLUE
010: GREEN
011: CYAN
100: RED
101: MAGENTA
110: YELLOW
111: WHITE TEXT DATA REPRESENTATION(1bit)
0: BACKGROUND DATA
1: TEXT DATA

CASE 1. BURST DATA WRITE(IMAGE)
SLAVE ADDRESS TRANSFER

MODE SETTING

PIXEL DATA TRANSFER

FIG. 8B

CASE 2. AREA DATA WRITE(IMAGE)
SLAVE ADDRESS TRANSFER

MODE SETTING

AREA START ADDRESS TRANSFER

AREA END ADDRESS TRANSFER

PIXEL DATA TRANSFER

FIG. 8C

CASE 3. LINE DATA WRITE(IMAGE)
SLAVE ADDRESS TRANSFER

MODE SETTING

LINE ADDRESS TRANSFER

PIXEL DATA TRANSFER

FIG. 8D

CASE 4. PIXEL DATA WRITE(IMAGE)
SLAVE ADDRESS TRANSFER

MODE SETTING

PIXEL ADDRESS TRANSFER

PIXEL DATA TRANSFER

FIG. 8E

CASE 5. BURST DATA WRITE(TEXT)
SLAVE ADDRESS TRANSFER

MODE SETTING

TEXT DATA TRANSFER

CASE 7. LINE DATA WRITE(TEXT)
SLAVE ADDRESS TRANSFER

MODE SETTING

LINE ADDRESS TRANSFER

TEXT DATA TRANSFER

FIG. 8H

CASE 8. PIXEL DATA WRITE(TEXT)
SLAVE ADDRESS TRANSFER

MODE SETTING

PIXEL ADDRESS TRANSFER

TEXT DATA TRANSFER

FIG. 9

METHOD AND APPARATUS FOR DISPLAYING DATA OF A DISPLAY SYSTEM

CROSS-REFERENCE TO RELATED APPLICATIONS

Pursuant to 35 U.S.C. § 119(a), this application claims the benefit of earlier filing date and right of priority to Korean Application No. 2000-85630, filed on Dec. 29, 2000, the contents of which are hereby incorporated by reference herein in their entirety.

BACKGROUND OF THE INVENTION

1. Field of the Invention

The present invention relates to an interface apparatus and a method thereof for a display system, and in particular to an interface apparatus and a method thereof for a display system which are capable of displaying an image and a text on a screen of a LCD (liquid crystal display) and minimizing a power consumption when a LCD (liquid crystal display) system is in a standby state.

2. Description of the Prior Art

Generally, a LCD (liquid crystal system) system such as an IMT-2000 (international mobile telecommunications 2000) compressing video data, restoring it and displaying it on a screen of a LCD is constructed with a main CPU (central processing unit), a video codec and a LCD (liquid crystal display) driver. Herein, the LCD system is operated as an active mode, a standby mode and a power down mode. The active mode means a normal operation mode, the standby mode means a standby state, and the power down mode means a state displaying nothing on a screen of a LCD but being ready for a display.

However, because the LCD system according to the prior art operates a video codec in a standby mode, it consumes lots of power unnecessarily. In more detail, when the video codec is operated in the standby mode of the LCD system in accordance with the prior art, power is unnecessarily consumed 20 times larger than the power consumption when the video codec is not operated.

SUMMARY OF THE INVENTION

Accordingly, it is an object of the present invention to provide an interface apparatus and a method thereof for a display system which are capable of minimizing a quantity of power consumption in a standby state of a display system by displaying an image (an animation, a still image and a text) and a text through an I2C (IIC) interface of a main CPU by not operating a video codec in a standby mode of the display system.

In order to achieve the above-mentioned object, an interface method for a display system includes outputting data including an image and a text, being inputted the data through an I2C interface in a standby mode and displaying the image and text on a screen, and being inputted the data through a video codec in an active mode and displaying the image and text on the screen.

In order to achieve the above-mentioned object, an interface apparatus for a display system includes a main CPU outputting data including an image and a text according to an operation mode of a system, a video codec being inputted the data and outputting it by interfacing with the main CPU according to the operation mode, and a driver being inputted the data through the video codec or being inputted the data from the main CPU through the I2C interface in accordance with the operation mode and displaying the image and text on the screen.

In order to achieve the above-mentioned object, in a method transmitting data to a memory of a LCD (liquid crystal display) driver through an I2C interface of a main CPU of a mobile communication terminal and writing the data, an interface method for a display system includes outputting sequentially a byte for slave address, a byte for mode setting and a byte for pixel data when the data is burst data, outputting sequentially a byte for slave address, a byte for mode setting, a byte for area start address, a byte for area end address and a byte for pixel data when the data is area data, outputting sequentially a byte for slave address, a byte for mode setting, a byte for line address, a byte for pixel data when the data is line data, and outputting sequentially a byte for slave address, a byte for mode setting, a byte for pixel address and a byte for pixel data when the data is pixel data in order to write the data in the memory.

DETAILED DESCRIPTION OF THE PREFERRED EMBODIMENT

Hereinafter, preferred embodiments of an interface apparatus and a method thereof for a LCD (liquid crystal display) system in accordance with the present invention which are capable of displaying an image (animation, still image, text) and a text on a screen of a LCD (liquid crystal display) through an I2C (IIC) interface of a main CPU without operating a video codec in a standby mode will be described in detail with reference to accompanying FIGS. 1~9.

Figure 1A:
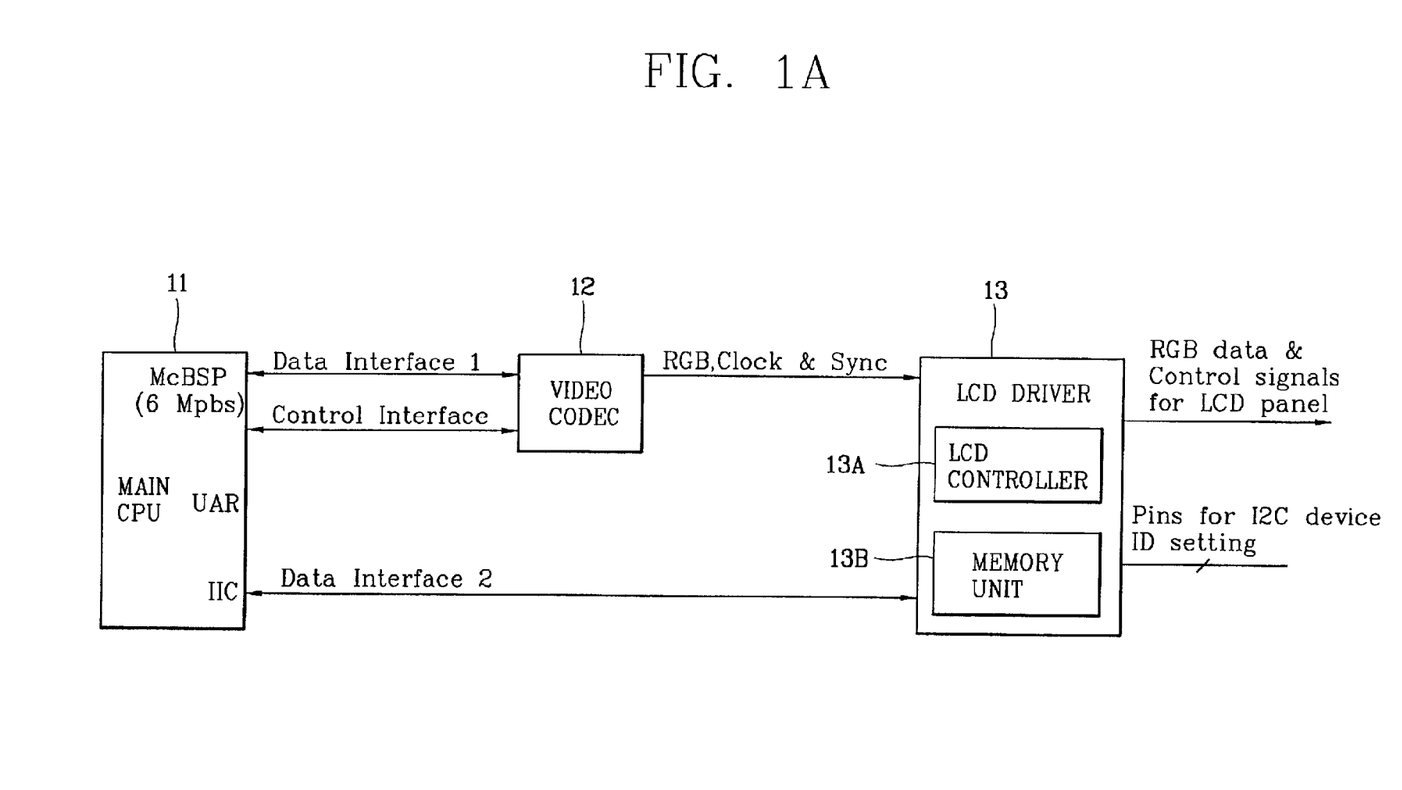
FIG. 1A is a block diagram illustrating an interface apparatus of a LCD (liquid crystal display) system in accordance with the present invention.

FIG. 1A is a block diagram illustrating an interface apparatus of a LCD system in accordance with the present invention.

Figure 1B:
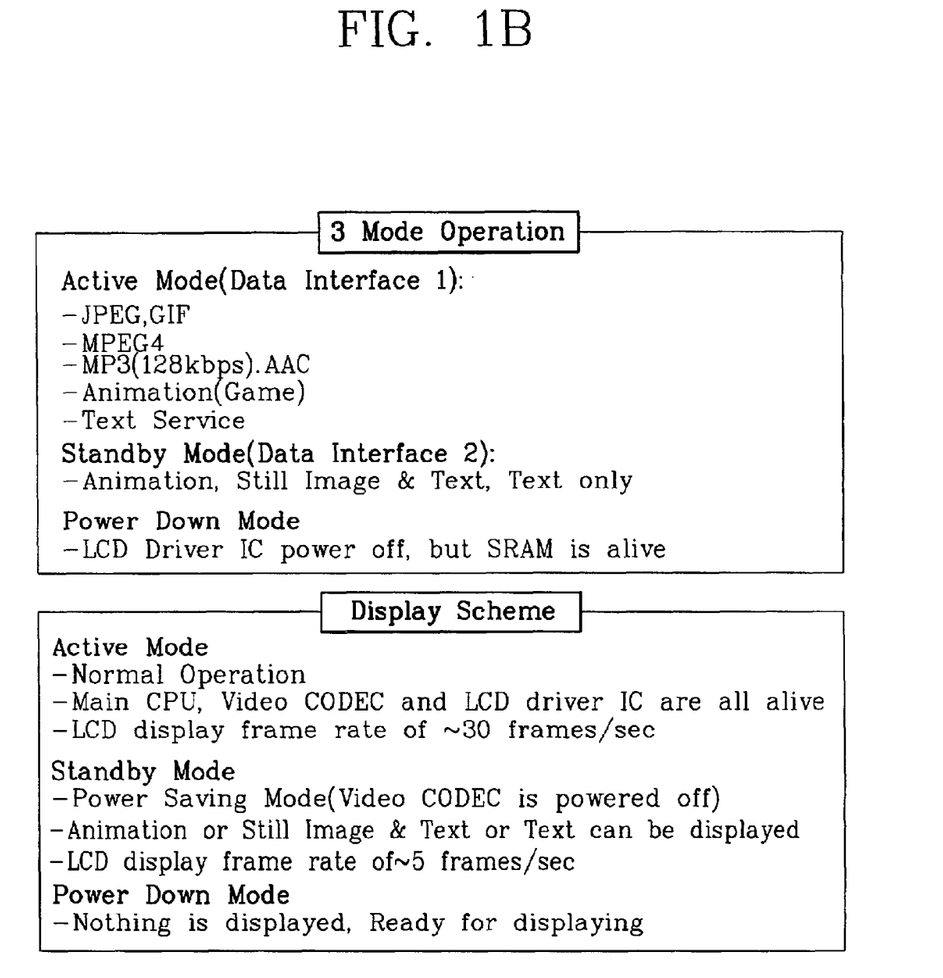
FIG. 1B illustrates an operation mode and a display scheme in accordance with the present invention.

As depicted in FIG. 1, an interface apparatus of a LCD system in accordance with the present invention includes a main CPU (Central Processing Unit) 11 outputting data having an image (still image, moving picture, animation) and a text to a LCD driver 13 through a video codec 12 in an active mode of a LCD system and outputting pertinent data (data having an image or a text, etc) to the LCD driver 13 by using an I2C interface in a standby mode of the LCD system, a video codec 12 being inputted data having a still image, a moving picture, an animation, a text from the CPU 11 and outputting it to the LCD driver 13 in the active mode, and a LCD driver 13 being inputted data through the video codec 12 in the active mode, displaying the image and text on a screen of the LCD, being directly inputted the data from the main CPU 11 in the standby mode and displaying the image and text of the data on the screen of the LCD. First, the LCD system is operated as three modes such as an active mode, a standby mode and a power down mode. The operation of the interface apparatus for the LCD system in accordance with the present invention will be described in detail with reference to accompanying FIGS. 1B~9.

FIG. 1B illustrates an operation mode and a display scheme in accordance with the present invention. In more detail, FIG. 1B illustrates the operation of the three modes (active mode, standby mode, power down mode) and the display scheme.

As depicted in FIG. 1B, the main CPU 11 the video codec 12 and the LCD driver 13 operate normally in the active mode. Herein, data such as an image (a still image, a moving picture, an animation) and a text, etc. is inputted to the LCD driver 13 through the video codec 12 at 30 frames per second, and the LCD driver 13 displays the inputted data on the screen of the LCD at 30 frames per second.

The standby mode is set when a key signal is not inputted for a certain time. Herein, a text can be displayed with a simple animation or still image as a background or only text can be displayed in the standby mode. Instead of it, the main CPU 11 transmits the data to the LCD driver 13 at 5 frames per second by using the I2C interface and stores it in a memory unit (example: SRAM) 13B of the LCD driver 13, and a LCD controller 13A of the LCD driver 13 displays the data stored in the memory unit 13B on the screen of the LCD at 5 frames per second.

The power down mode means nothing is displayed on the screen of the LCD but the LCD system is ready for displaying.

Figure 2:
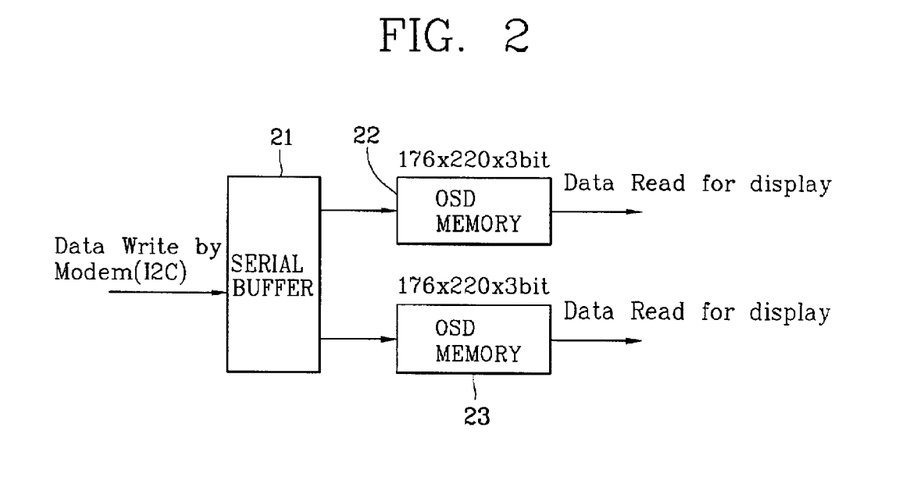
FIG. 2 is a block diagram illustrating a memory unit in accordance with the present invention.

FIG. 2 is a block diagram illustrating the memory unit in accordance with the present invention. In more detail, FIG. 2 is a block diagram illustrating the memory of the LCD driver 13.

As depicted in FIG. 2, the LCD driver 13 stores the data (serial data) transmitted from the main CPU11 through the I2C interface in a serial buffer 21 first and stores it in OSD (on screen display) memories 22, 23 constructed as a parallel format. Herein, while the main CPU 11 writes data in the OSD memory 22, the LCD controller 13A reads pre-stored data from the other OSD memory 23 and displays it on the screen of the LCD, accordingly delay in the data output is not occurred by the read/write operations of the memories 22, 23.

For reference, by considering 176×220 (1 pixel is constructed with three elements respectively describing R, G, B colors) pixel acknowledged by a provisional usage of a LCD panel for an IMT-2000 terminal, a memory of 176×220×3 bit as a size of one frame is used as the OSD memories 22, 23. Herein, by the LCD controller 13A, when the display operation is performed, a clock signal outputted from an oscillator (not shown) of the LCD driver 13 is used.

In the meantime, the clock signal is used in mode setting of 1 byte of data transmitted once in the I2C interfacing between the main CPU 11 and the LCD driver 13. The mode setting will now be described in detail with reference to accompanying FIG. 3.

Figure 3:
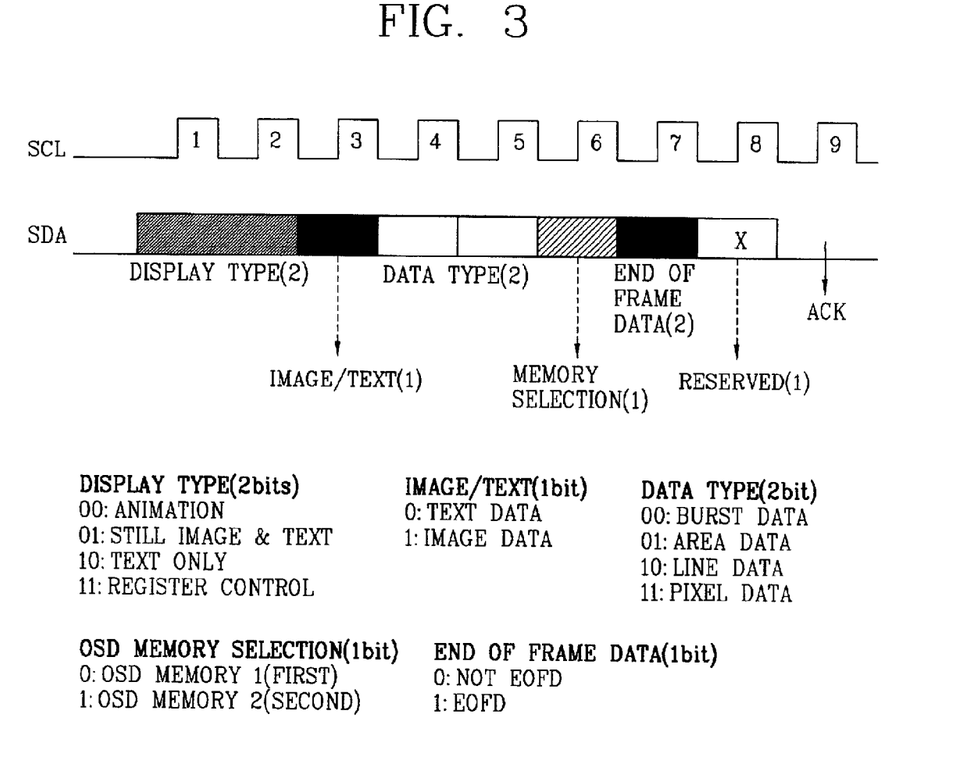
FIG. 3 is a format view illustrating a mode setting in accordance with the present invention.

FIG. 3 is a format view illustrating a mode setting in accordance with the present invention.

As depicted in FIG. 3, the mode setting is classified into a display type (2 bit), an image/text type (1 bit), a data type (1 bit), an OSD memory selection bit (1 bit) and an EOFD (end of frame data) (1 bit).

First, the display type (2 bit) describes a kind of data to be played. The kind of data to be displayed is largely divided into an animation display, a text display with a still image background, only text display and a mode for register control for a LCD controller. In more detail, the memory of the LCD driver 13 is allocated according to the display type. Herein, by saving power of unused memory cells, a quantity of power consumption can be reduced. The memory allocation according to the display type will be described in detail with reference to accompanying FIGS. 5~7.

The image/text type (1 bit) describes whether transmitted data is image data or text data. Image data is constructed as 3 bit, and text data is constructed as 1 bit.

The data type (1 bit) describes a type of data, data type is largely divided into burst data, area data, line data and pixel data. Data write stream in accordance with the data type will be described in detail with reference to accompanying FIGS. 8A~8H.

The OSD memory selection bit (1 bit) is for making the main CPU 11 select each of two OSD memories of the LCD driver 13. The EOFD (end of frame data) (1 bit) is for notifying the end of frame data. In more detail, the EOFD (1 bit) is for coinciding a synchronous of time write data in the memory unit 13B with a time for reading contents stored in the memory unit 13B by the main CPU 11 and displaying it by the LCD controller 13A. When the main CPU 11 shows the EOF (end of frame) with the written data, the main CPU 11 does not access to the pertinent memory for a preset certain time, and for the preset certain time the LCD controller 13A reads updated data of the memory by the main CPU 11 and displays it on the screen of the LCD.

Figure 4:
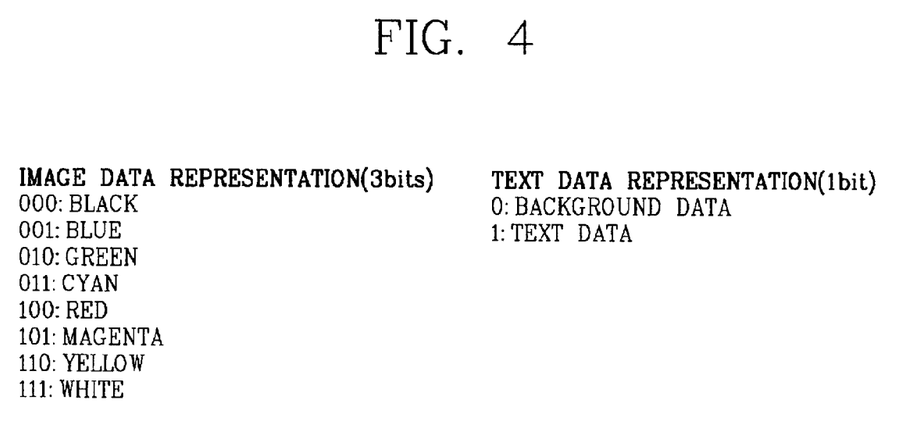
FIG. 4 illustrates an expression example about each data in accordance with the present invention.

FIG. 4 illustrates an expression example about each data in accordance with the present invention.

Figure 9:
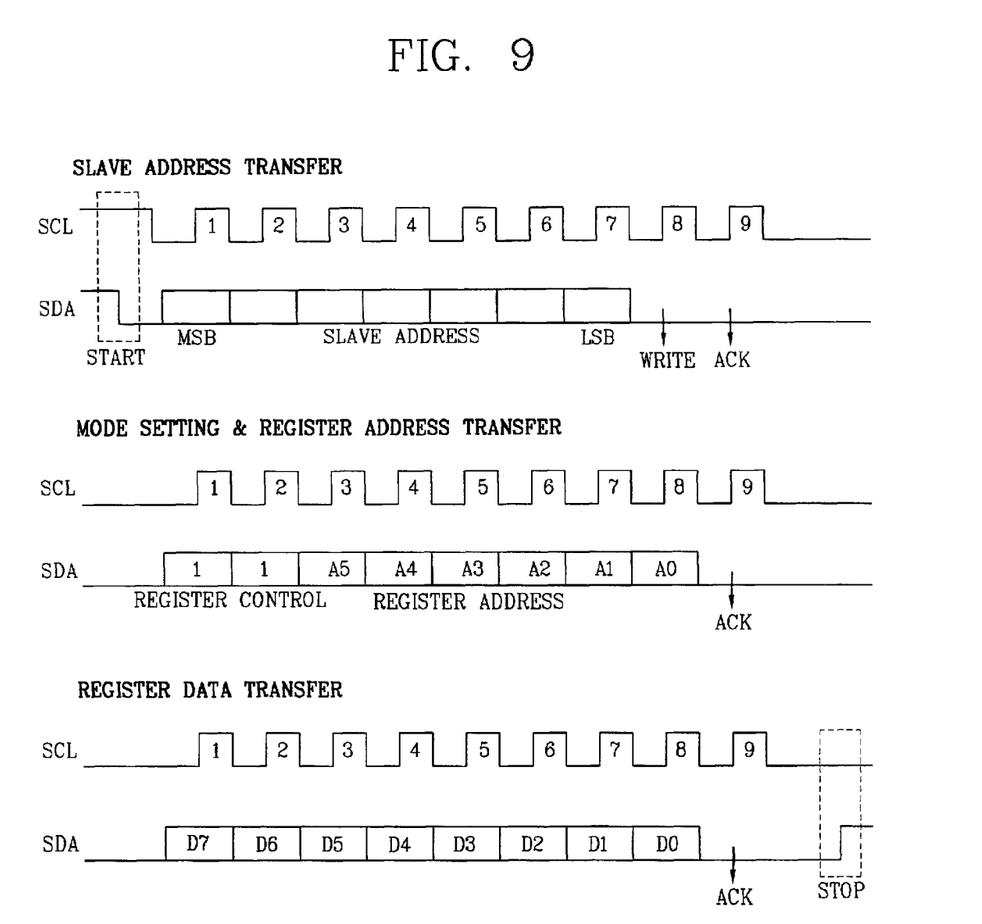
FIG. 9 is a write format view illustrating register control data in order to describe a method for writing register control data.

As depicted in FIG. 4, 3 bit image data describes 8 colors. In text data of 1 bit, "0" means a background data, "1" means text data, it is possible to select a color of background data and text data by using register control data as shown at FIG. 9.

Figure 5:
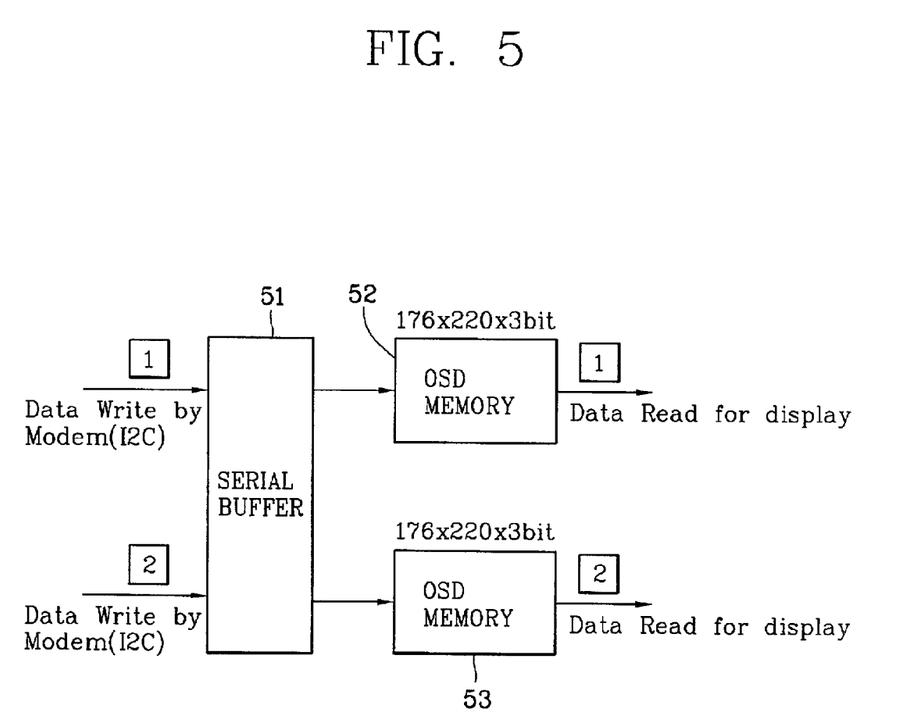
FIG. 5 is a block diagram illustrating a memory unit for an animation mode in accordance with the present invention.

FIG. 5 is a block diagram illustrating a memory unit for an animation mode in accordance with the present invention.

As depicted in FIG. 5, both two memories 52, 53 of 176×220×3 bit of the LCD driver 13 are used. As described above, when the main CPU 11 writes data in the OSD memory 52, data pre-stored in the other OSD memory 53 is read and displayed on the screen of the LCD. When present recording data is the last data of a frame, by setting the EOFD bit as "1", a display controller (not shown) reads the pertinent data and informs that the pertinent data can be displayed on the screen of the LCD.

Figure 6:
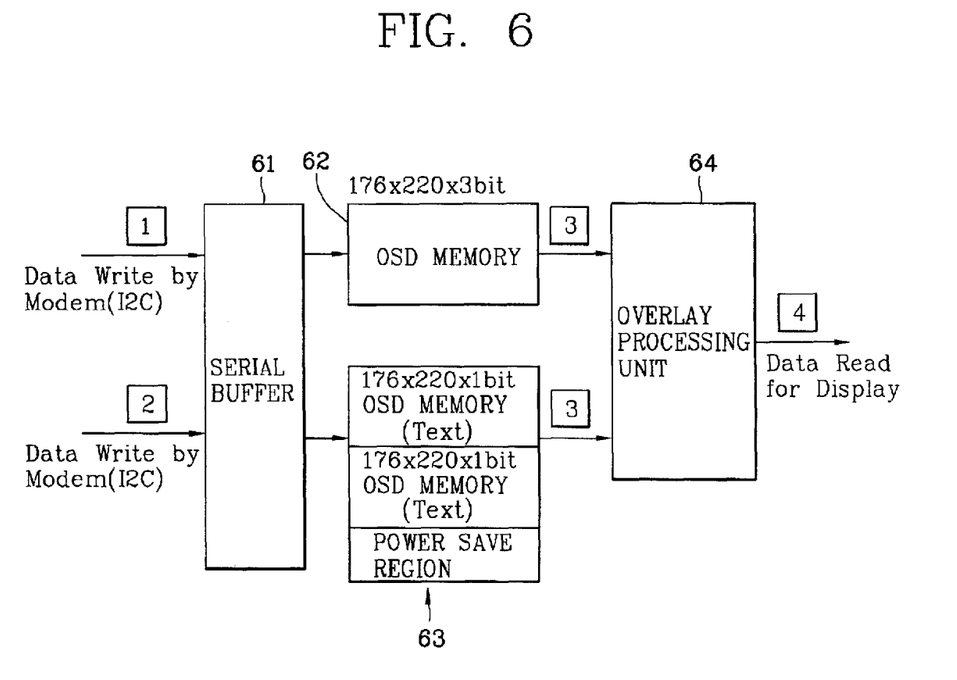
FIG. 6 is a block diagram illustrating a memory for a still image and a text display mode.

FIG. 6 is a block diagram of a memory for a still image and a text display mode.

As depicted in FIG. 6, between the two ISD memories 62, 63 of the LCD driver 13, the OSD memory 62 is used for storing a background still image. The other OSD memory 63 is divided into three regions, two regions having a size of 176×220×1 bit are selected as text regions, and text data is updated. Unused one regions is operated (set) as a power save mode.

The still image data and text data stored in the OSD memories 62, 63 are displayed on the screen of the LCD as an overlay format through an overlay processing unit 64. A method for adjusting the control register is used in a command about the overlay. For example, when data is recorded on the one text memory, data of the other memory is read and is displayed on the screen of the LCD. Herein, when data to be written is the last data of a frame, by setting the EOFD bit as "1", the display controller reads the pertinent data and informs that the pertinent data can be displayed on the screen of the LCD.

Figure 7:
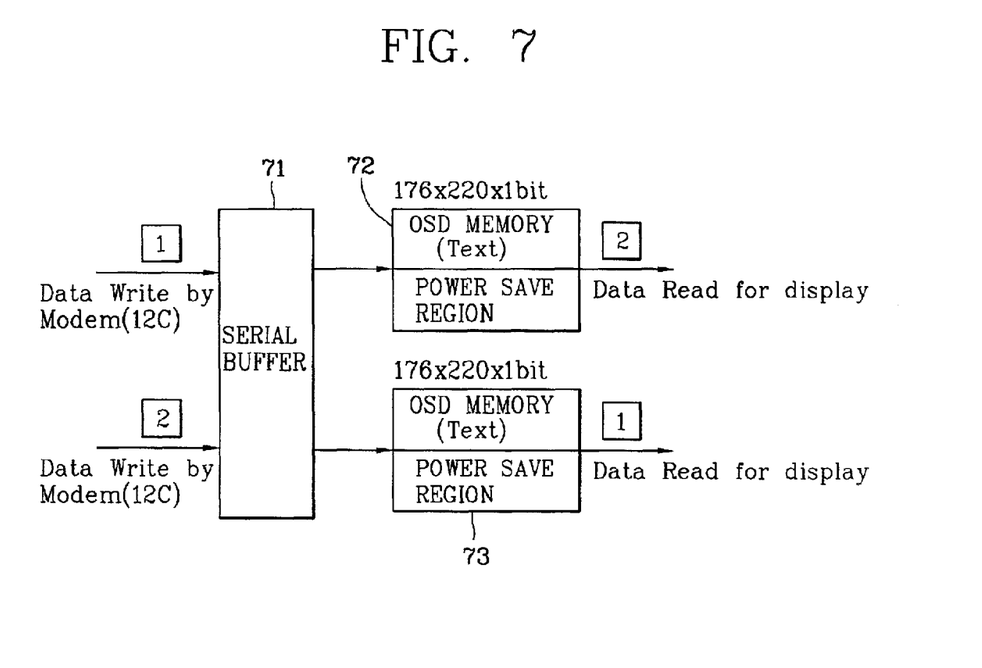
FIG. 7 is a block diagram illustrating a memory only for a text display mode.

FIG. 7 is a block diagram illustrating a memory for a text display mode.

As depicted in FIG. 7, in each OSD memory 72, 73, only the region of 176×220×1 bit is used for reading/writing a text, rest regions are operated (set) as power save regions. Herein, while the text data transmitted form the main CPU 11 is recorded on the one OSD memory, namely, the OSD memory 72, the text data pre-stored in the other OSD memory 73 is read and displayed on the screen of the LCD. In addition, when the recorded data is the last data of the frame, by setting the EOFD bit as "1", the display controller reads the pertinent data and informs that the pertinent data can be displayed.

For example, each OSD memory illustrated in FIGS. 5~7 is all same OSD memory, however it has different reference numeral according to the operation type (mode).

FIGS. 8A~8H illustrate data formats about a method for writing data in an OSD memory according to control of a main CPU of a LCD system. In more detail, data is classified into 8 types in which kinds of data to be written is an image or a text and types of data is burst, area, line or pixel. Herein, FIGS. 8A~8E illustrate examples of format for writing the image data. Hereinafter, each data write method will be described as below.

First, a write method of burst data will be described with reference to accompanying FIG. 8A.

In the first place, in order to be suitable for an I2C standard, a slave address of a device (the LCD driver 13) is transmitted through a first byte. Because it is writing data, a 8th bit set as "0". A second byte is for transmitting contents about a mode setting. Because transmitted data is image data, an image/text bit is set as "1", and because a write type is a burst type, a data type is set as "00". In this case, because data of one frame is transmitted at one time, the EOFD bit is set as "1". A display type and an OSD memory selection bit are set so as to be corresponded to an access method of the present main CPU 11. And, 3 bit pixel data is transmitted from a third byte. In more detail, when the number of pixels of the used LCD is 176×220, 38720 data are transmitted, and after that, the transmission is stopped (finished). The above-mentioned write method can be used in transmission of an animation display and a still background image.

An area data write method will be described with reference to accompanying FIG. 8B.

Figure 8A:
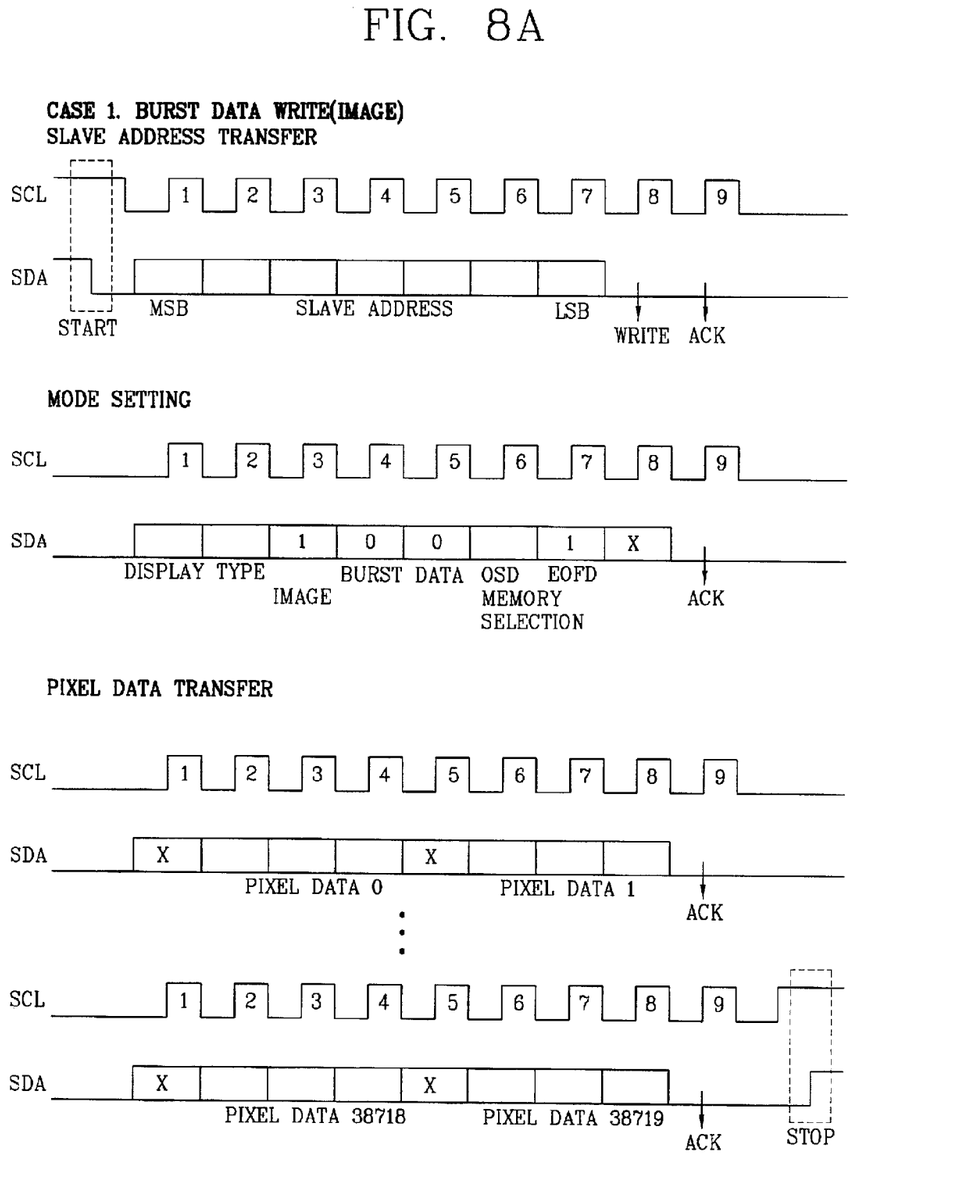
FIGS. 8A~8H illustrate data formats about a method for writing data in OSD memories according to control of a main CPU of a LCD system.
Figure 8B:
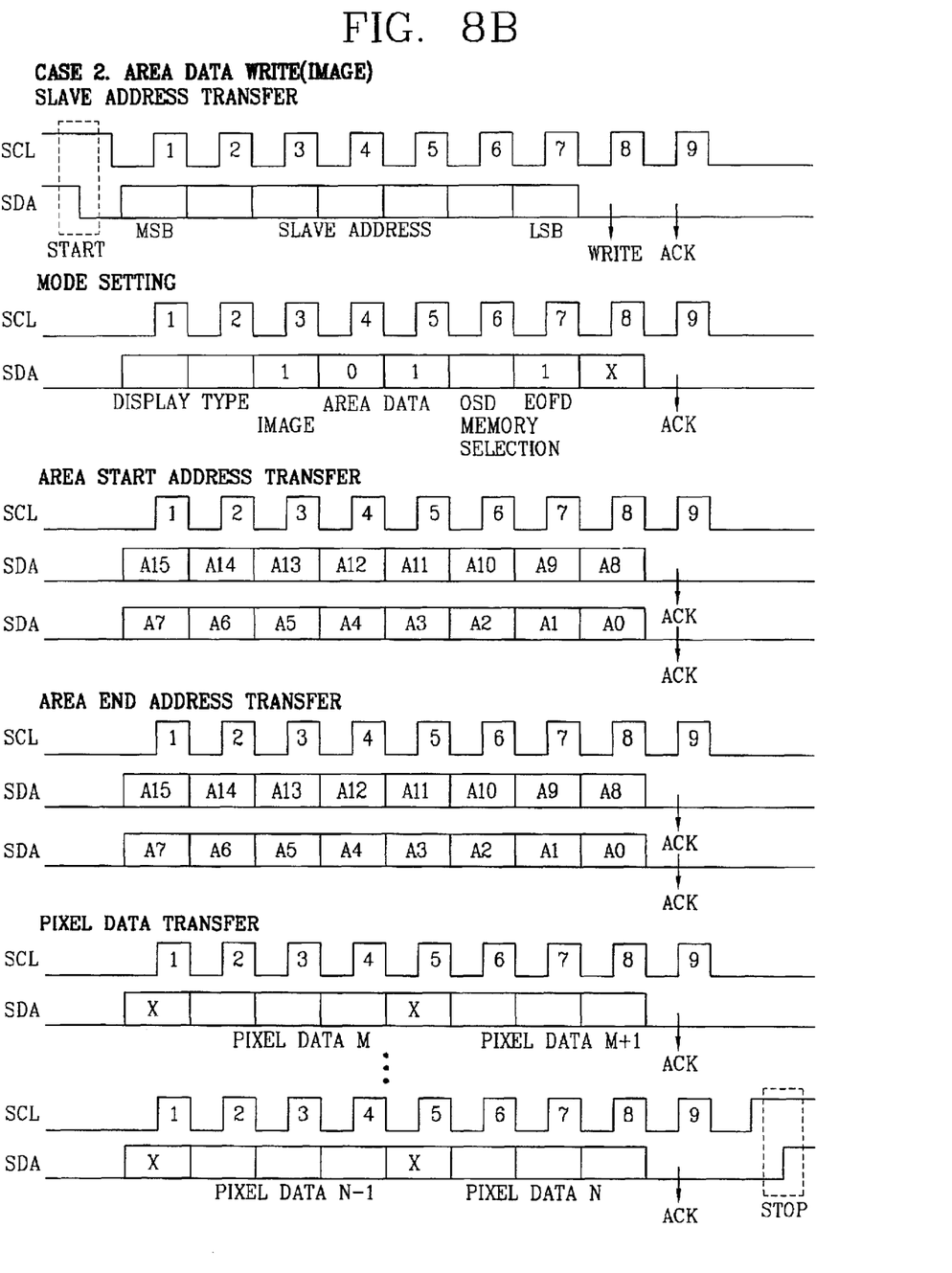

As well as FIG. 8A, a slave address of the device is transmitted through a first byte. In case of data writing, a 8th bit is set as "0". As same with the above-mentioned method, a second byte is for transmitting contents about a mode setting, because the transmitted data is image data, an image/text bit is set as "1", and because a write type is an area type, a data type is set as "01". A display type ad an OSD memory selection bit are set so as to be corresponded to a method for accessing to the present main CPU 11. A start address of an area is transmitted through a third byte. When the number of pixels of the used LCD is 176×220, because 16 bit address exists, a start address of 2 byte is transmitted. The last address of the area is transmitted through a fourth byte. A start address of 2 byte is transmitted. From a fifth byte, pixel data of the selected area is transmitted and stopped. The above-mentioned write method can be used valuably when a small animation image is displayed or some part is updated or a small still image is used as a background.

Figure 8C:
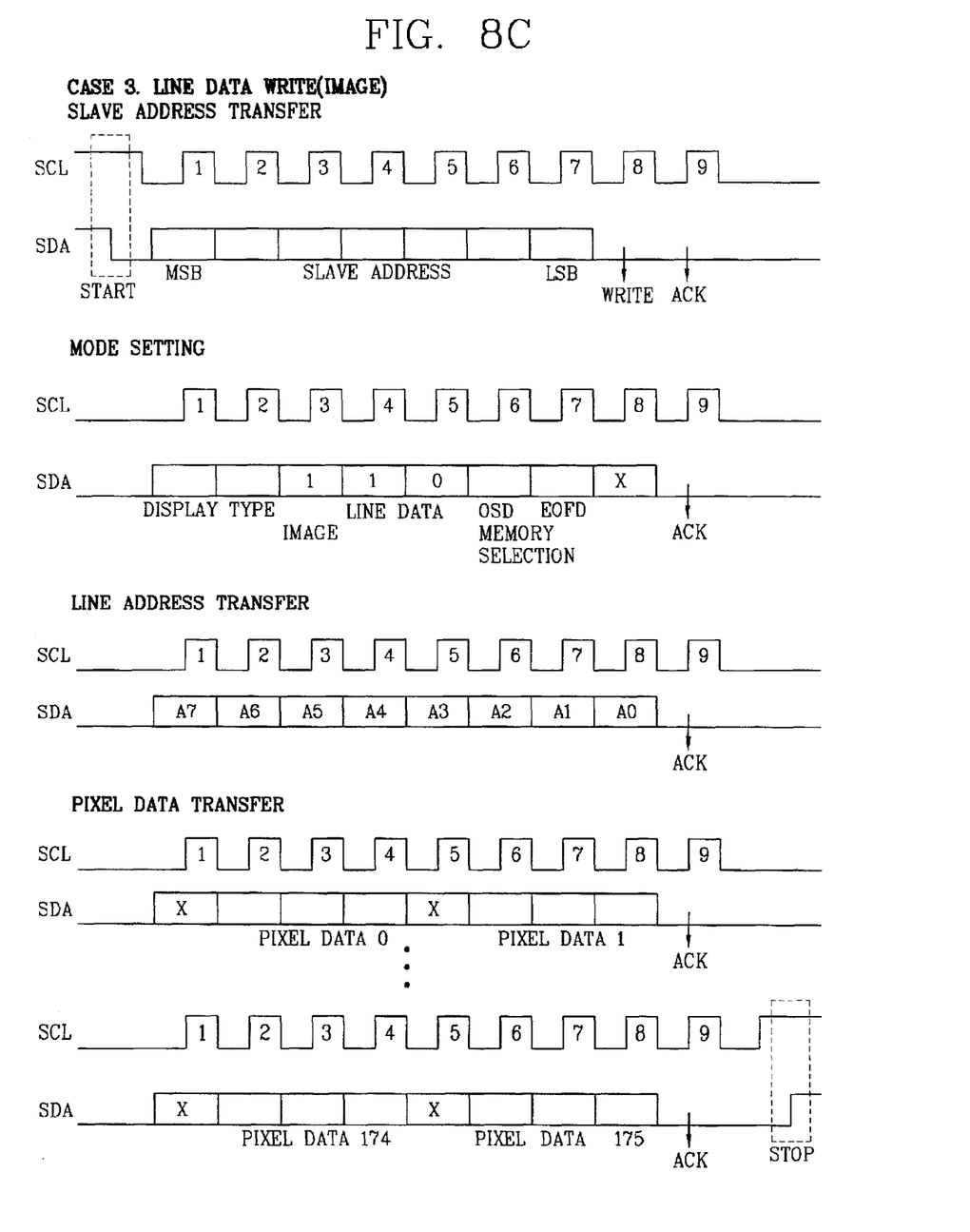

A write method of line data will be described with reference to accompanying FIG. 8C. As same with the above-mentioned method, the slave address of the device is transmitted through a first byte. It is also writing data, a 8th bit is set as "0". In a second mode setting byte, transmitted data is image data, the image/text bit is set as "1", and because the write type is a line type, data type is set as "10". A line address is transmitted through a third byte, when the number of pixels of the used LCD is 176×220, a line address of 8 bit is transmitted. From a fourth byte, pixel data is transmitted. The transmission is stopped after transmitting 176 image data describable one line. As depicted in FIG. 8B, the above-mentioned write method can be used valuably in partial update of an animation image or a still image. Herein, the update method is selected by a program language according to conditions.

Figure 8D:
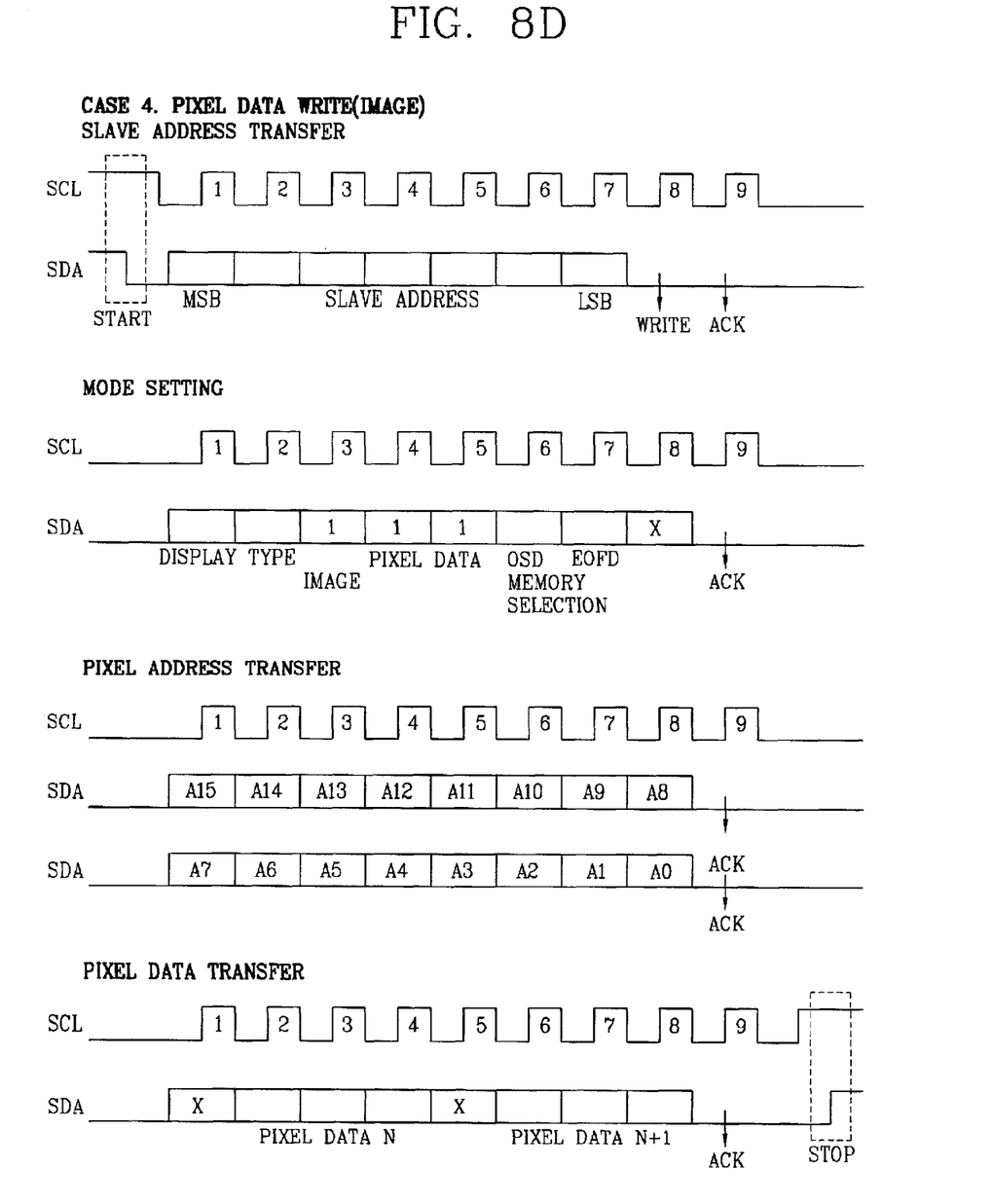

A write method of pixel data will be described with reference to accompanying FIG. 8D. A slave address of the device is transmitted through a first byte. Because it is writing data, a 8th bit is set as "0". In a second mode setting byte, because transmitted data is image data, an image/text bit is set as "1", and because a write type is pixel type, a data type is set as "11". An address of pixel is transmitted through a third byte. When the number of pixels of the used LCD is 176×220, because a 16 bit pixel address exists, a 2 byte address is transmitted. Pixel data is transmitted through a fourth byte. It is possible to update up to two image pixels by using a byte. It is determined by the program language whether one pixel is updated or two pixels are updated at the same time. The above-mentioned write method can be used valuably in partial update of an animation image or a still image.

In the meantime, FIGS. 8E~8H illustrate examples of a format for writing text data. First, a write method of burst data will be described with reference to accompanying FIG. 8E.

Figure 8E:
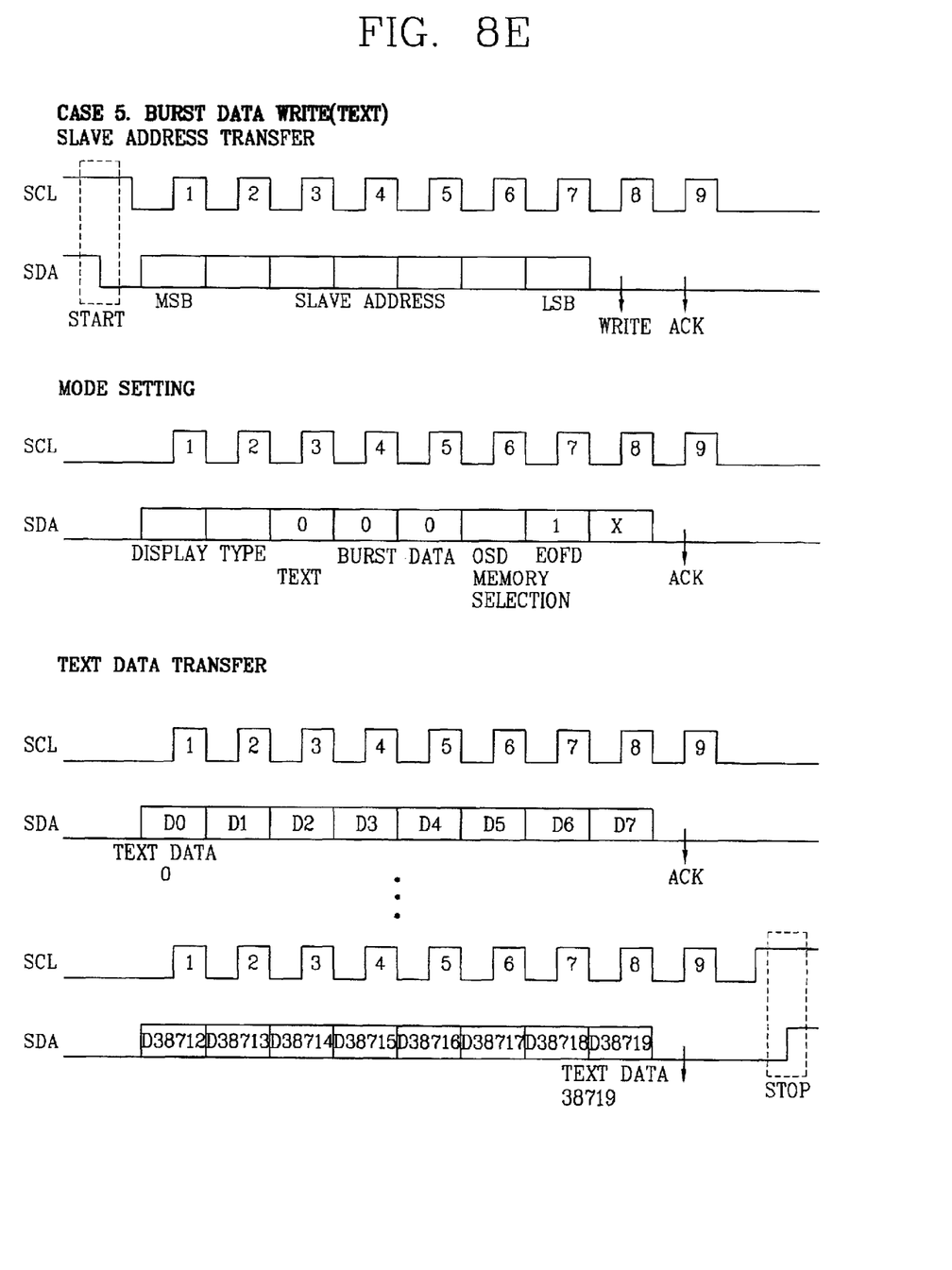

A slave address of the device is transmitted through a first byte. Because it is writing data, a 8th bit is set as "0". In a second mode setting byte, because transmitted data is text data, an image/text bit is set as "0", and because a write type is a burst type, data type is set as "00". In this case, because data of one frame is transmitted at one time, the EOFD bit is set as "1". Text data is transmitted from a third byte. Each text data is constructed as 1 bit, when the number of pixels of the used LCD is 176×220, 38720 text data are transmitted. The above-mentioned write method can be valuably used in update of all text data of one frame.

Figure 8F:
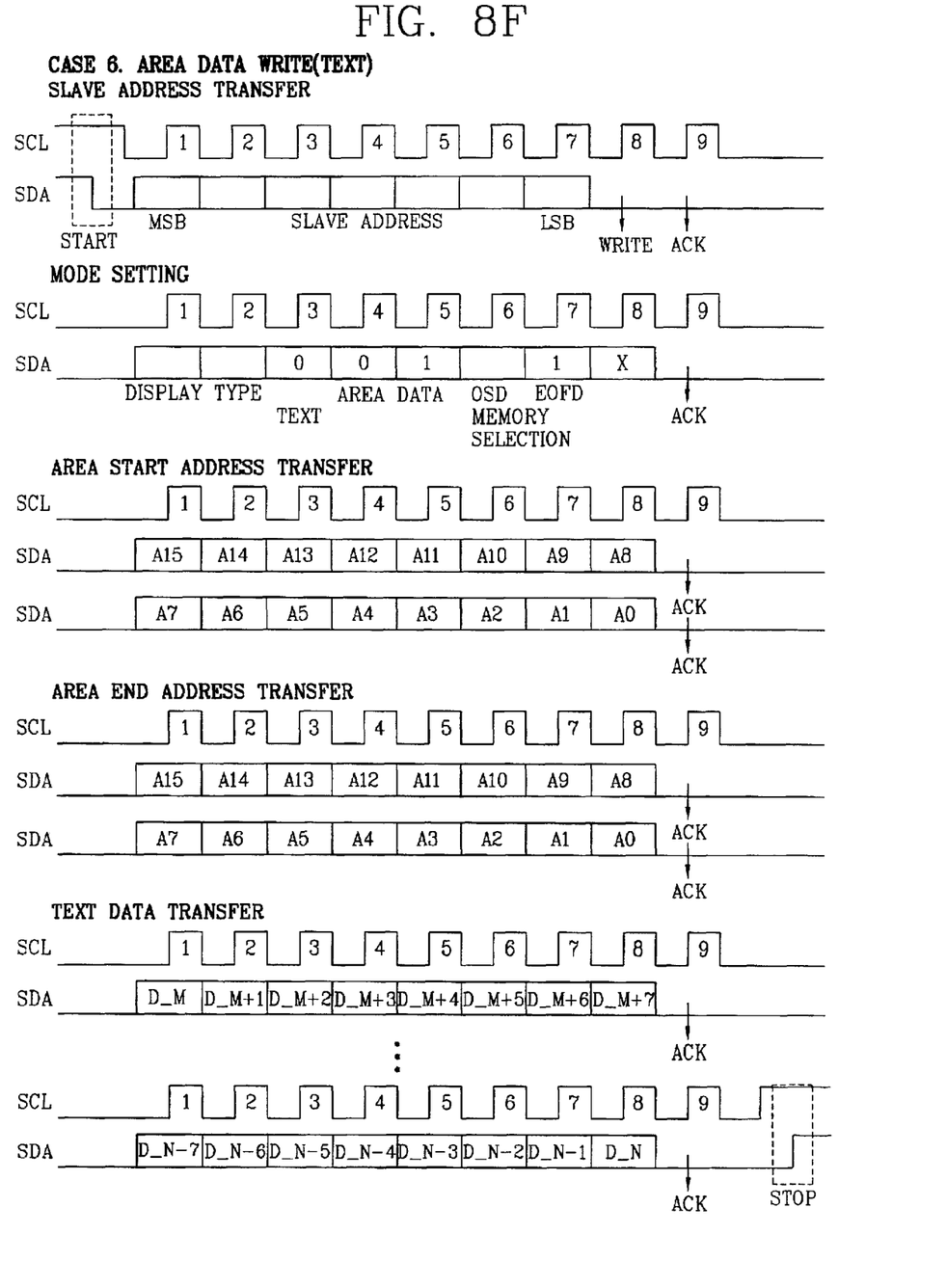

A write method of area data will be described with reference to accompanying FIG. 8F. A slave address of the device is transmitted through a first byte. Because it is writing the data, a 8th bit is set as "0". In a second mode setting byte, because transmitted data is text data, an image/text bit is set as "0", and because a write type is an area type, data type is set as "01". A start address of the area is transmitted through a third byte. When the number of pixels of the used LCD is 176×220, because 16 bit address exists, a start address of 2 byte is transmitted. The last address of the area is transmitted through a fourth byte. The last address is 2 byte. From a fifth byte, text data of the selected area is transmitted and stopped. In the above-mentioned write method can be variously used in partial update of text data.

Figure 8G:
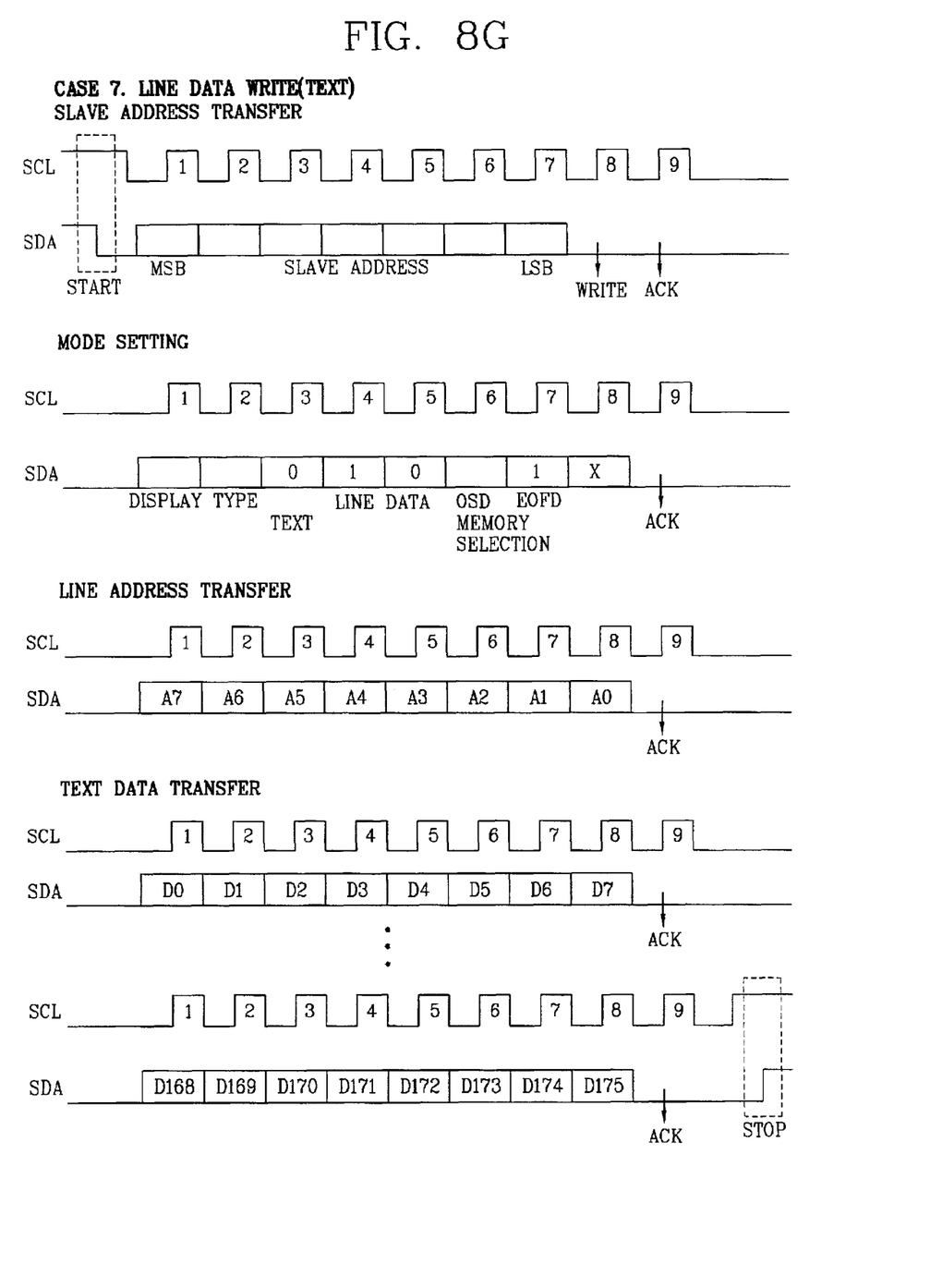

A write method of line data will be described with reference to accompanying FIG. 8G.

First, a slave address of the device is transmitted through a first byte. Because it is writing data, a 8th bit is set as "0". In a second mode setting byte, because transmitted data is text data, an image/text bit is set as "0", and because a write type is a line type, a data type set as "10". An address of the line is transmitted through a third byte. When the number of pixels of the used LCD is 176×220, 8 bit line address is transmitted. From a fourth byte, text data is transmitted. 176 text data describable one line are transmitted and the transmission is stopped. The above-mentioned write method can be valuably used in partial update of text data as well as the method shown at FIG. 8F.

Figure 8H:
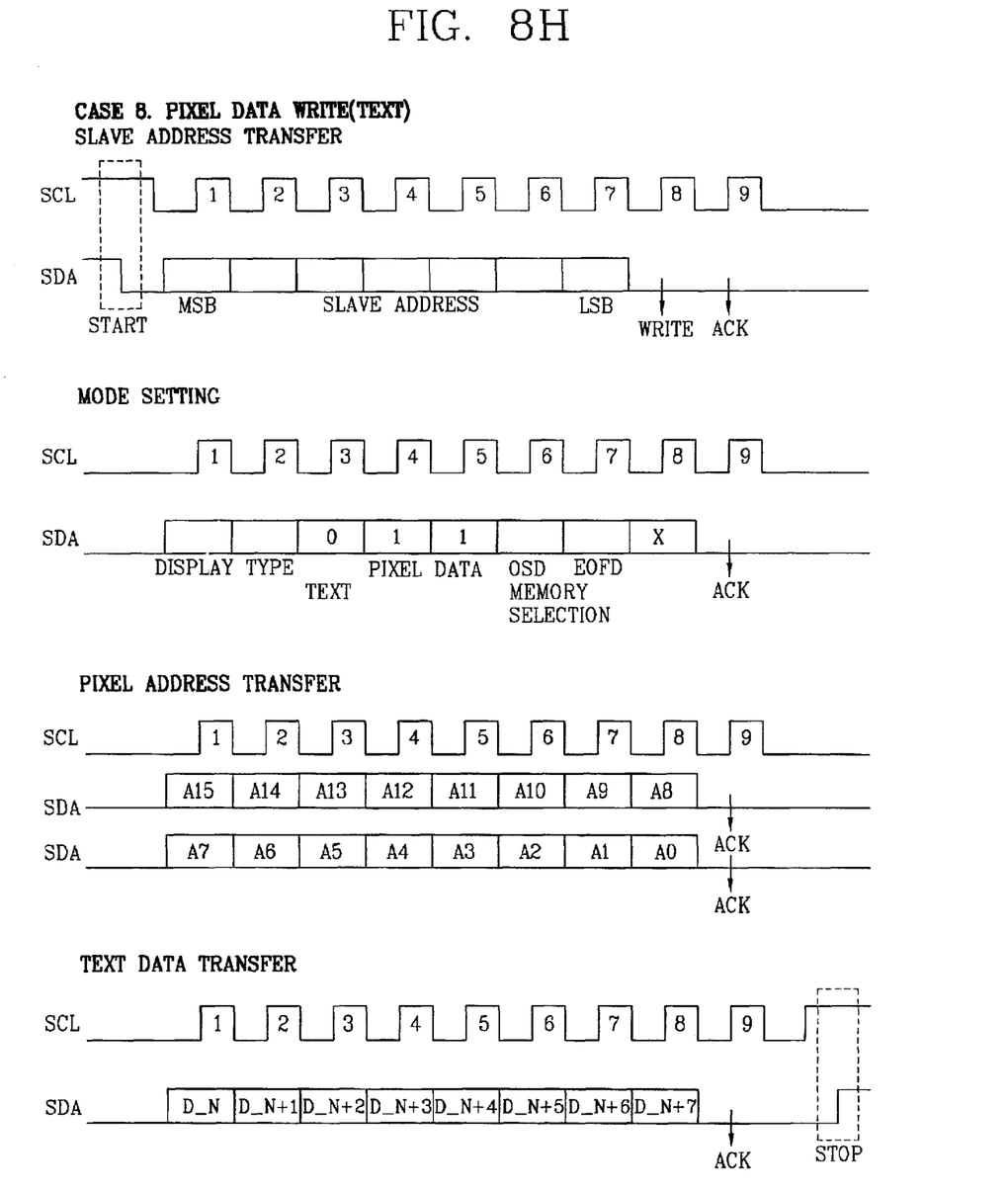

A write method of pixel data will be described with reference to accompanying FIG. 8H.

First, a slave address of the device is transmitted through a first byte. Because it is writing data, a 8th bit is set as "0". In a second mode setting byte, because transmitted data is text data, an image/text bit is set as "0", and because a write type is a pixel type, a data type is set as "11". An address of the pixel is transmitted through a third byte. When the number of pixels of the used LCD is 176×220, because 16 bit pixel address exists, 2 byte address is transmitted. And, text data is transmitted through a fourth byte. Herein, it is possible to update up to 8 text data by using one byte. At this point, the number of updated text data is determined by the program language. The above-mentioned write method can be valuably used in the partial update of text data.

FIG. 9 is a write format view illustrating register control data in order to describe a method for writing register control data. In more detail, it illustrates a method for writing register control data.

First, an address of the device is transmitted through a first byte. Because it is writing data, a 8th bit is set as "0". A second byte is about a mode setting and an address of a register, in the register control, a first 2 bit is set as "11". And, the rest 6 bit are used as an address of the control register, in this case 64 control registers can exist. And, data to be written is transmitted to the register through a third byte.

By using the control register, a motion (active, standby, power down) mode is set, positions of OSD (on screen display) regions are selected, on/off of the selected OSD regions are determined or colors of a text and a background in the regions are selected. For reference, the rest control registers are selected after due consultation with manufactures of the LCD driver 13.

The LCD system in accordance with the present invention is for reducing power consumption of the display system, the present invention is not limited to the LCD system, it can be used for a display apparatus such as an organic electroluminescence, etc.

As described above, in the interface apparatus and the method thereof for the display system in accordance with the present invention, a video codec is not operated in a standby mode of the LCD system, because image (animation, still image and text) and text are displayed on the screen of the LCD through the I2C interface between the memory and the main CPU of the LCD driver, accoridngly in the usage of the video codec power consumption is 20 times smaller than a quantity of power consumption in the conventional art. In more detail, by using the interface apparatus and the method thereof for the display system in accordance with the present invention for a portable terminal such as an IMT-2000 terminal, a PDA (personal digital assistant), etc., a quantity of power consumption in the standby state is 20 times smaller than a quantity of power consumption in the conventional art.

What is claimed is:

1. A method for displaying data of a display system, comprising:
   outputting one of first data and second data, the first data comprising at least one of an image and text according to an active mode of a display system and the second data comprising at least one of a still image and still text according to a standby mode of the display system; and
   receiving the second data through an I2C interface in the standby mode of the display system and displaying the received second data on a screen of the display system; and
   receiving the first data through a video codec in the active mode of the display system and displaying the received first data on the screen of the display system, wherein the video codec is not operated in the standby mode.

2. The method according to claim 1, wherein the second data is displayed on the screen without passing through the video codec when the display system is in the standby mode.

3. The method according to claim 1, wherein the image according to the active mode of the display system is one of a moving picture and an animation.

4. The method according to claim 1, wherein the second data comprises a background of one of the still image and text only.

5. The method according to claim 1, wherein the first data and second data are transmitted to a memory and written in the memory.

6. The method according to claim 5, wherein transmitting and writing data in the memory comprises the steps of:
   outputting sequentially a byte for slave address, a byte for mode setting and a byte for pixel data when the data is burst data;
   outputting sequentially a byte for slave address, a byte for mode setting, a byte for area start address, a byte for area end address and a byte for pixel data when the data is area data;
   outputting sequentially a byte for slave address, a byte for mode setting, a byte for line address and a byte for pixel data when the data is line data; and
   outputting sequentially a byte for slave address, a byte for mode setting, a byte for pixel address and a byte for pixel data when the data is pixel data in order to write the data in the memory.

7. The method according to claim 6, wherein a pertinent bit of the byte for slave address is set as "1" when the data is image data and the pertinent bit of the byte for slave address is set as "0" when the data is text data.

8. The interface method according to claim 6, wherein the byte for mode setting includes an image/text classification bit, a data type classification bit and an end of frame data (EOFD) bit informing the end of frame data.

9. The method according to claim 8, wherein the EOFD bit is set as "1" when data of one frame is transmitted at one time.

10. The method according to claim 6, wherein a display type bit and an OSD (On Screen Display) memory selection bit of the byte for mode setting in the burst data outputting step are set so as to correspond to an access method of a main CPU (Central Processing Unit).

11. The method according to claim 1, further comprising:
   setting an operation mode comprising one of the active mode, the standby mode and a power down mode by one of using a control register, selecting a position of OSD (on screen display) regions, and determining an on/off state of the selected OSD regions.

12. An apparatus for displaying data of a display system, comprising:
- a main CPU (Central Processing Unit) outputting one of first data and second data, the first data comprising at least one of an image and text according to an active mode of a display system and the second data comprising at least one of a still image and still text according to a standby mode of the display system;
- a video codec receiving and outputting the first data by interfacing with the main CPU in accordance with the active mode of the display system; and
- a driver receiving one of the first data and the second data, the first data received through the video codec in accordance with the active mode of the display system and the second data received through an I2C interface of the main CPU in accordance with the standby mode of the display system and displaying the received data on a screen of the display system in the standby mode, wherein the video codec is not operated in the standby mode.

13. The apparatus according to claim 12, wherein the second data is displayed on the screen without passing through the video codec when display system is in the standby mode.

14. The apparatus according to claim 12, wherein the driver is a LCD (liquid crystal display) driver.

15. The apparatus according to claim 12, wherein the display system is a LCD system.

16. The apparatus according to claim 12, wherein the main CPU transmits the second data to the driver through the I2C interface when the display system is in the standby mode.

17. The apparatus according to claim 12, wherein the video codec receives the first data and outputs the received first data to the driver by interfacing with the main CPU when the display system is in the active mode.

18. The apparatus according to claim 12, wherein the driver directly receives the second data from the main CPU and displays the received second data on the screen when the display system is in the standby mode.

19. The apparatus according to claim 12, wherein the image according to the active mode of the display system comprises one of a moving picture and an animation.

20. The apparatus according to claim 12, wherein the driver receives the first data at 30 frames per second through the video codec when the display system is in the active mode and displays the received first data on the screen at the same speed.

21. The apparatus according to claim 12, wherein the driver receives the first data at 5 frames per second through the video codec when the display system is in the standby mode and displays the received first data on the screen at the same speed.

22. The apparatus according to claim 12, wherein the second data comprises a background of one of the still image and text only.

23. The apparatus according to claim 12, wherein the driver includes:
- a serial buffer temporarily storing the first and second data received from the main CPU; and
- two OSD (on screen display) memories alternately receiving the first and second data through the serial buffer and storing the received first and second data, wherein the two OSD memories are constructed in parallel.

24. An apparatus for displaying data of a liquid crystal display (LCD) system with reduced power consumption in a standby mode, comprising:
- a main CPU (Central Processing Unit) outputting one of first data and second data, the first date comprising at least one of an image and text in accordance with an active mode of a LCD system and the second data comprising at least one of a still image and still text according to a standby mode of the LCD system;
- a video codec receiving and outputting the first data by interfacing with the main CPU when the LCD system is in the active mode; and
- a LCD driver receiving one of the first data and the second data, the first data received through the video codec in accordance with the active mode of the LCD system and the second data received from the main CPU through an I2C interface without passing through the video codec in accordance with the standby mode of the LCD system and displaying the received second data on a screen of the LCD system in the standby mode, wherein the video codec is not operated in the standby mode.

25. A method for displaying data of a display system, comprising:
- outputting data comprising one of an image and text when the display system is in an active mode;
- outputting data comprising one of a still image and still text when the display system is in a standby mode; and
- receiving the data through a video codec in the active mode and through an interface without passing through the video codec in the standby mode of the display system and displaying the received data on a screen of the display system, wherein the video codec is not operated in the standby mode.

* * * * *